US012791390B2

(12) United States Patent
Park et al.

(10) Patent No.: US 12,791,390 B2
(45) Date of Patent: Nov. 10, 2026

(54) SENSING DEVICE

(71) Applicant: LG Chem, Ltd., Seoul (KR)

(72) Inventors: Jong-Hyuk Park, Daejeon (KR); Yong-Ho Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 167 days.

(21) Appl. No.: 18/702,534

(22) PCT Filed: Aug. 4, 2023

(86) PCT No.: PCT/KR2023/011530

§ 371 (c)(1),
(2) Date: Apr. 18, 2024

(87) PCT Pub. No.: WO2024/177212

PCT Pub. Date: Aug. 29, 2024

(65) Prior Publication Data

US 2025/0277704 A1 Sep. 4, 2025

(30) Foreign Application Priority Data

Feb. 22, 2023 (KR) ........................ 10-2023-0023952

(51) Int. Cl.
*G01J 5/0806* (2022.01)
*G01J 5/00* (2022.01)
(Continued)

(52) U.S. Cl.
CPC ............... *G01J 5/07* (2022.01); *G01J 5/0025* (2013.01); *G01J 5/047* (2013.01); *G01J 5/0806* (2013.01);
(Continued)

(58) Field of Classification Search
CPC .. G01J 5/07; G01J 5/0025; G01J 5/047; G01J 5/0806; G01J 5/025; G01J 5/04;
(Continued)

(56) References Cited

U.S. PATENT DOCUMENTS 4,873,469 A * 10/1989 Young .................... H05B 47/13
340/567
6,369,688 B1 4/2002 Abe et al.
(Continued)

FOREIGN PATENT DOCUMENTS

CN 107633635 A 1/2018
EP 0937971 A1 8/1999
(Continued)

OTHER PUBLICATIONS

Translation of JP2020012747 (Year: 2020).*
(Continued)

*Primary Examiner* — Uzma Alam
*Assistant Examiner* — Mamadou Faye
(74) *Attorney, Agent, or Firm* — Lerner David LLP

(57) ABSTRACT

A sensing device is disclosed. The sensing device according to an embodiment of the present disclosure includes an infrared sensor; a condenser lens located on a front side of the infrared sensor; and a cover located on a front side of the condenser lens to cover the condenser lens, and having a hole that is smaller than the condenser lens.

11 Claims, 21 Drawing Sheets

(51) Int. Cl.

| | |
|---|---|
| ***G01J 5/04*** | (2006.01) |
| ***G01J 5/07*** | (2022.01) |
| ***G08B 3/10*** | (2006.01) |
| ***G08B 5/38*** | (2006.01) |
| ***G08B 13/193*** | (2006.01) |

(52) U.S. Cl.
CPC ................. *G08B 3/10* (2013.01); *G08B 5/38* (2013.01); *G08B 13/193* (2013.01)

(58) Field of Classification Search
CPC .......... G08B 3/10; G08B 5/38; G08B 13/193; G08B 5/36
See application file for complete search history.

(56) References Cited

U.S. PATENT DOCUMENTS

| | | | | |
|---|---|---|---|---|
| 6,371,925 | B1 * | 4/2002 | Imai | G01J 5/049 600/549 |
| 6,522,912 | B1 | 2/2003 | Nakatani et al. | |
| 6,653,635 | B2 * | 11/2003 | Liao | G08B 13/193 250/353 |
| 8,952,331 | B2 | 2/2015 | Ueda et al. | |
| 9,202,356 | B1 | 12/2015 | Kobayashi | |
| 2015/0008325 | A1 * | 1/2015 | Mans | G01J 5/047 250/338.1 |
| 2017/0122799 | A1 | 5/2017 | Okudo et al. | |
| 2019/0059142 | A1 * | 2/2019 | Chen | F21V 15/01 |
| 2021/0148761 | A1 | 5/2021 | Okumura et al. | |

FOREIGN PATENT DOCUMENTS

| | | | | |
|---|---|---|---|---|
| EP | 1077046 | A1 | | 2/2001 |
| JP | 2002122479 | A | | 4/2002 |
| JP | 3316970 | B2 | | 8/2002 |
| JP | 2003217048 | A | | 7/2003 |
| JP | 2007101513 | A | | 4/2007 |
| JP | 2015200559 | A | | 11/2015 |
| JP | 2018169219 | A | | 11/2018 |
| JP | 2020012747 | A | * | 1/2020 |
| JP | 2021081539 | A | | 5/2021 |
| KR | 100331748 | B1 | | 4/2002 |
| KR | 20150046564 | A | | 4/2015 |
| KR | 20180101117 | A | | 9/2018 |
| KR | 20190057876 | A | | 5/2019 |
| KR | 200493996 | Y1 | | 7/2021 |
| KR | 2023130929 | A | | 9/2023 |

OTHER PUBLICATIONS

Extended European Search Report including Written Opinion for Application No. 23924319.9 dated May 28, 2025. 7 pages.

International Search Report for PCT/KR2023/011530 mailed Nov. 15, 2023. 3 pages. (see pp. 2-3, categorizing the cited references).

* cited by examiner

SENSING DEVICE

CROSS-REFERENCE TO RELATED APPLICATIONS

The present application is a national phase entry under 35 U.S.C. § 371 of International Application No. PCT/KR2023/011530 filed on Aug. 4, 2023, which claims priority to Korean Patent Application No. 10-2023-0023952, filed on Feb. 22, 2023, the disclosures of which are hereby incorporated by reference herein.

TECHNICAL FIELD

The present disclosure relates to a sensing device. More particularly, the present disclosure relates to a sensing device installed in a restricted area such as dangerous goods storage, guardrails and the like to detect an intruder and provide an alarm.

BACKGROUND ART

There are some restricted facilities or areas from which humans are not allowed to enter or facilities in which entry is not allowed for a certain period of time. For example, unauthorized persons are not allowed to enter facilities such as dangerous goods storage and guardrails or construction sites such as scaffolding sites to prevent safety incidents.

One of methods for banning entry to prohibited or restricted areas is to place signs indicating prohibited areas such as traffic cones in the corresponding facilities or areas to provide visual indication that passing or entering is prohibited.

However, in frequent instances, those who did not recognize the indication may enter the restricted areas and be exposed to the risk of safety incidents.

To solve this problem, systems for preventing safety incidents or illegal behaviors have been proposed, in which a warning sound is issued when a human is detected in a restricted area using an infrared sensor capable of detecting humans.

A typical example of the infrared sensor for detecting humans is a Passive Infrared (PIR) sensor. The PIR sensor may detect infrared light emitted from human body. Additionally, in general, the detection angle of the PIR sensor is about 120°. However, when the PIR sensor having the detection angle of 120° is used, a very wide detection range may be set. As a consequence, the detection system may output a warning for a behavior or action that is not actually an entry to the restricted area or break-in.

SUMMARY

Technical Problem

The present disclosure is directed to providing a sensing device including a structure for effectively limiting a detection range.

The present disclosure is further directed to providing a sensing device including a structure for maintaining sensitivity over the reduced detection range.

The present disclosure is further directed to providing a sensing device having a structure for enabling cover replacement to variously adjust the detection range.

The present disclosure is further directed to providing a sensing device that is easy to install.

Technical Solution

To achieve the above-described objective, a sensing device according to an embodiment of the present disclosure includes an infrared sensor; a condenser lens located on a front side of the infrared sensor; and a cover located on a front side of the condenser lens to cover the condenser lens, and having a hole that is smaller than the condenser lens.

Additionally, the cover may include a portion having an increasing inner diameter toward a rear side.

Additionally, a distance between the hole and the infrared sensor may be larger than a diameter of the hole.

Additionally, the cover may extend rearwards.

Additionally, an inner surface of the cover may have an emissive structure.

Additionally, the condenser lens may have a frontward protruding shape, and the cover may accommodate at least a portion of the condenser lens.

Additionally, the cover may include a shield wall protruding from an inner surface and covering the condenser lens.

Additionally, the shield wall may include a shield hole having a smaller diameter than the hole.

Additionally, the cover may be rotatable in a direction in which the infrared sensor is oriented.

Additionally, the sensing device may further include a body at which the infrared sensor is installed; and a warning unit disposed in the body and configured to output sound or light in response to infrared light detected through the infrared sensor.

Additionally, the sensing device may further include a body at which the infrared sensor is installed; and a pair of sights protruding from an upper surface of the body.

Additionally, the sensing device may further include a body at which the infrared sensor is installed; and a coupling bar extending below the body.

Additionally, the sensing device may further include a mount that is coupled to the coupling bar.

Advantageous Effects

According to at least one of the embodiments of the present disclosure, it may be possible to provide the sensing device including the structure for effectively limiting the detection range to improve accuracy.

According to at least one of the embodiments of the present disclosure, it may be possible to provide the sensing device including the structure for maintaining sensitivity over the reduced detection range.

According to at least one of the embodiments of the present disclosure, it may be possible to provide the sensing device having the structure for enabling cover replacement to variously adjust the detection range.

According to at least one of the embodiments of the present disclosure, it may be possible to provide the sensing device that is easy to install.

BRIEF DESCRIPTION OF THE DRAWINGS

The accompanying drawings illustrate exemplary embodiments of the present disclosure and together with the following detailed description, serve to provide a further understanding of the technical aspect of the present disclosure, and thus the present disclosure should not be construed as being limited to the drawings.

DETAILED DESCRIPTION

Figure 1:
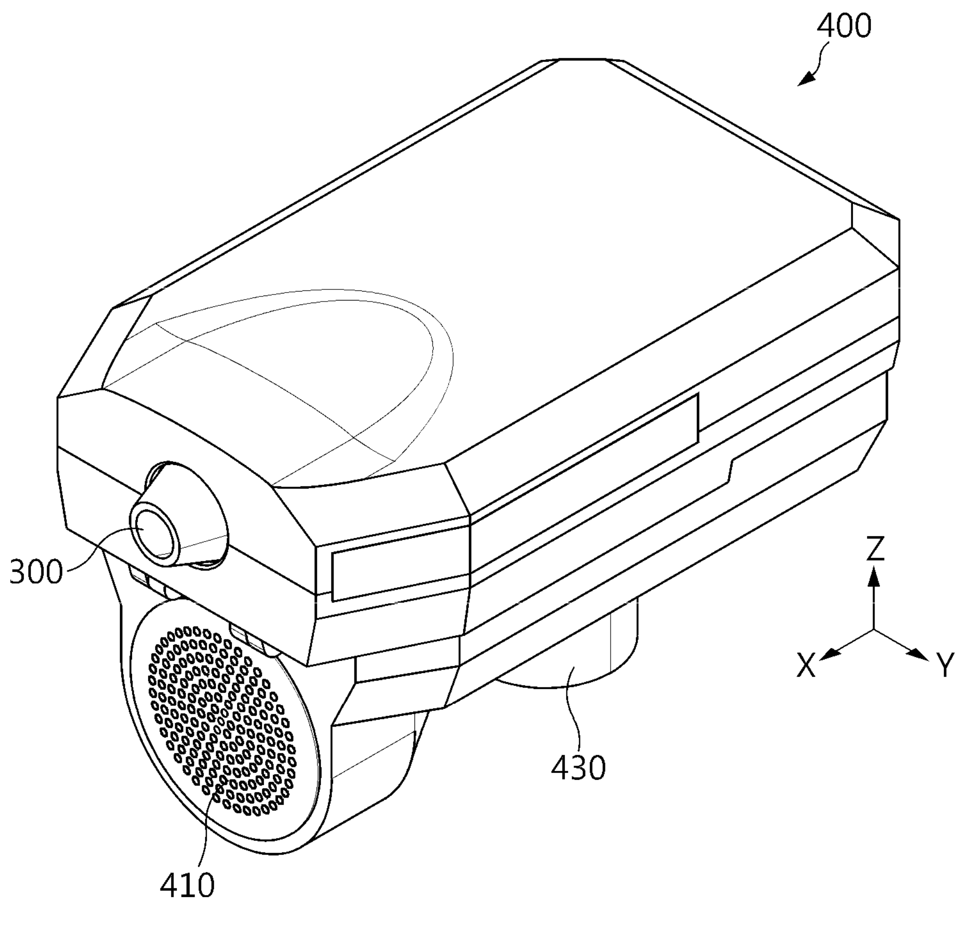
FIG. 1 is a perspective view of a sensing device according to an embodiment of the present disclosure.

Hereinafter, exemplary embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspect of the present disclosure on the basis of the principle that the inventor is allowed to define the terms appropriately for the best explanation.

Therefore, the embodiments described herein and the illustrations shown in the drawings are exemplary embodiments of the present disclosure to describe the technical aspect of the present disclosure and are not intended to be limiting, so it should be understood that a variety of other equivalents and modifications could have been made thereto at the time that the application was filed.

Figure 2:
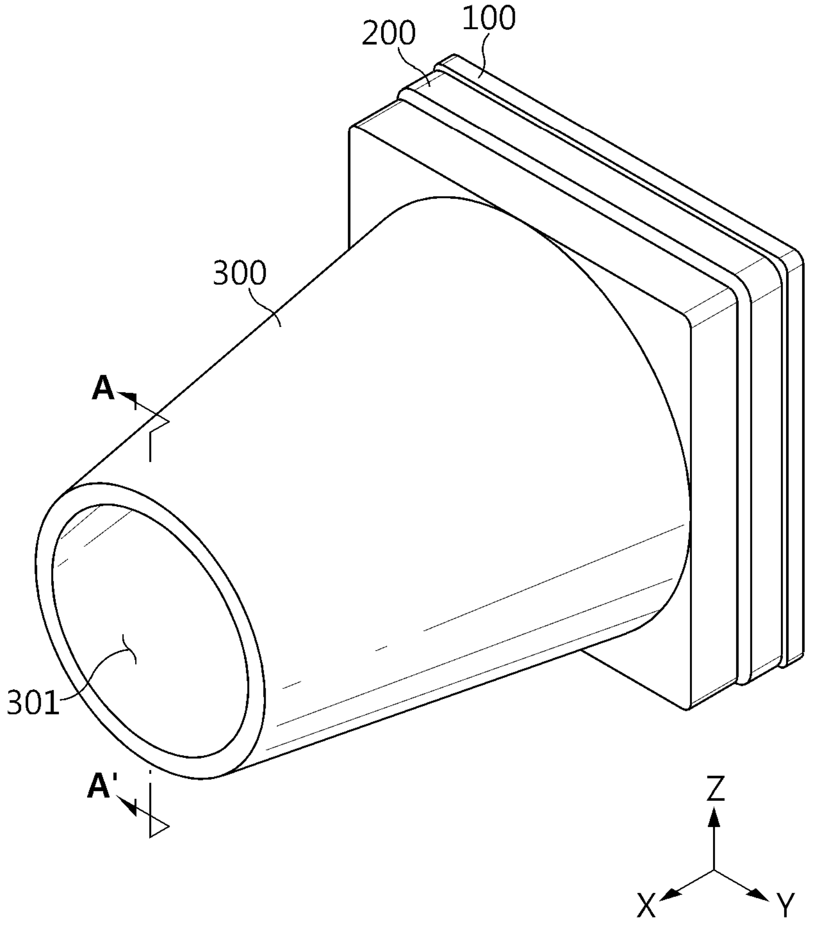
FIG. 2 is a partial perspective view of a sensing device according to an embodiment of the present disclosure.
Figure 3:
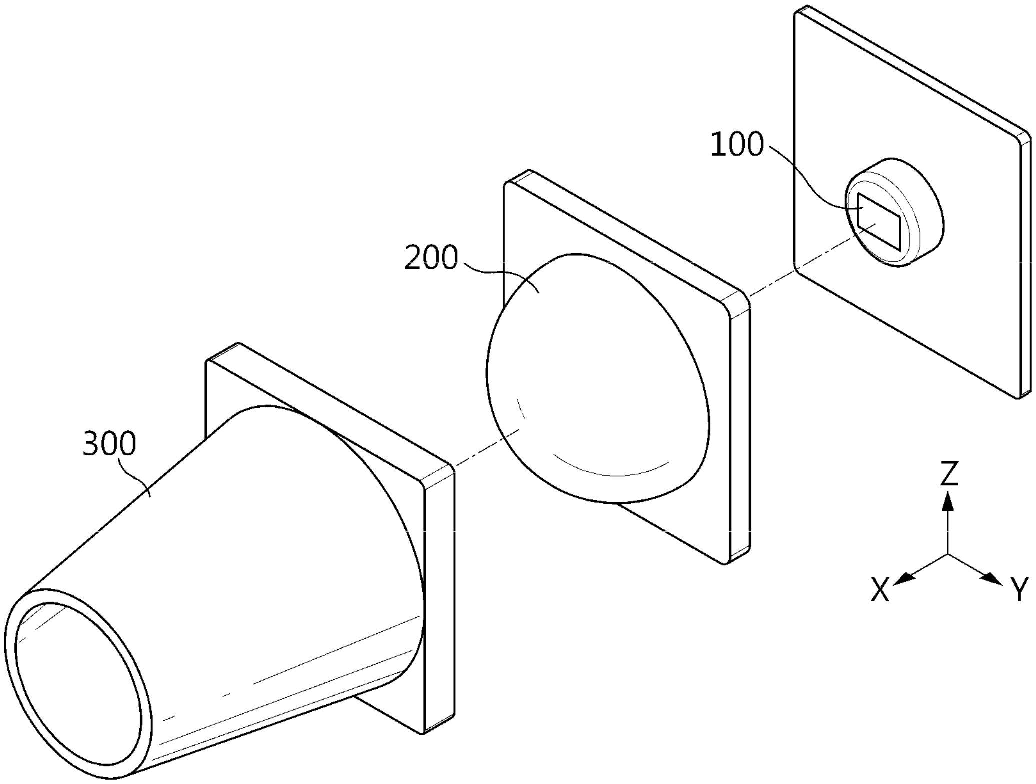
FIG. 3 is a partial exploded view of a sensing device according to an embodiment of the present disclosure.
Figure 4:
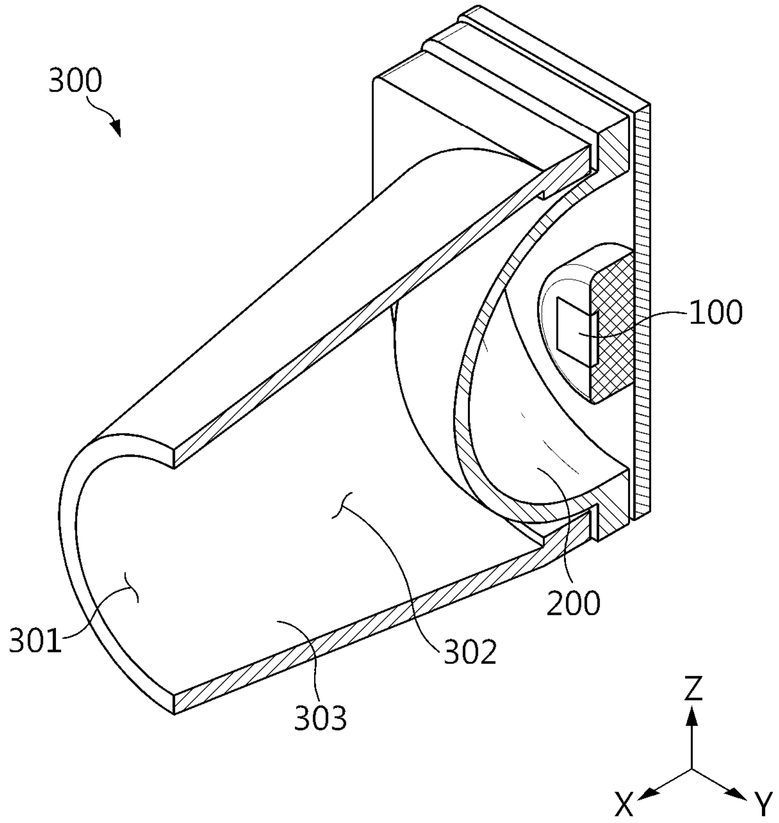
FIG. 4 is a cross-sectional perspective view of FIG. 2, taken along the line A-A'.
Figure 5:
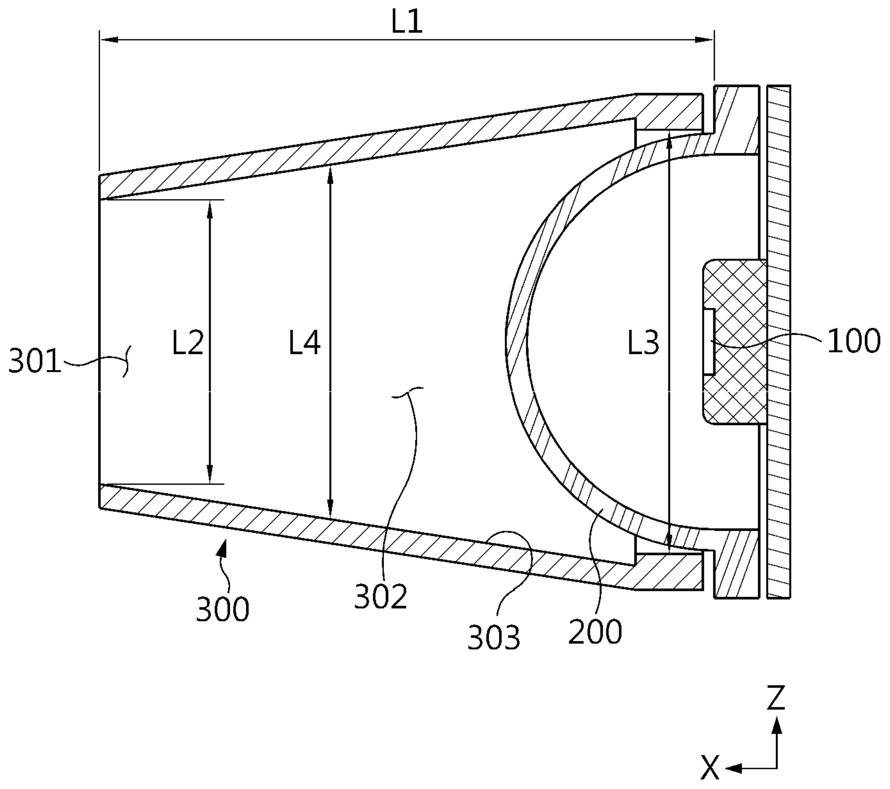
FIG. 5 is a cross-sectional view of FIG. 2, taken along the line A-A'.

FIG. 1 is a perspective view of a sensing device according to an embodiment of the present disclosure. FIG. 2 is a partial perspective view of the sensing device according to an embodiment of the present disclosure. FIG. 3 is a partial exploded view of the sensing device according to an embodiment of the present disclosure. FIG. 4 is a cross-sectional perspective view of FIG. 2, taken along the line A-A'. FIG. 5 is a cross-sectional view of FIG. 2, taken along the line A-A'.

Referring to FIGS. 1 to 5, the sensing device according to an embodiment of the present disclosure may include an infrared sensor 100, a condenser lens 200 and a cover 300. The infrared sensor 100 may be configured to detect infrared light incident from the external environment. For example, the infrared sensor 100 may be a Passive Infrared (PIR) Sensor. The infrared sensor 100 may detect infrared light emitted from human body. In general, the infrared sensor 100 may have a detection angle of about 120°. The infrared sensor 100 may have a detection range oriented in the frontward direction or +X axis direction. The infrared sensor 100 may be installed in a body 400.

The condenser lens 200 may be located on the front side of the infrared sensor 100 or in +X axis direction. The condenser lens 200 may converge infrared light incident from the external environment to a focal point. For example, the condenser lens 200 may be a Fresnel lens. In this instance, the infrared sensor 100 may be located at the focal point of the condenser lens 200. The condenser lens 200 may be coupled, fastened, fixed or assembled to the infrared sensor 100.

The cover 300 may be disposed on the front side of the condenser lens 200 or in +X axis direction. The cover 300 may cover at least a portion of the condenser lens 200. The cover 300 may be made of a material having the ability to shield light including infrared light. For example, the cover 300 may be made of a polymer.

Additionally, the cover 300 may have a hole 301. In particular, the cover 300 may have a hollow extending in the front-rear direction (X axis direction). Additionally, the hollow may be open at the front end and the rear end. Here, the hole 301 may refer to the front opening of the hollow.

Additionally, the hole 301 may face the condenser lens 200. For example, the hole 301 may be circular in shape. In this instance, the cover 300, the condenser lens 200 and the infrared sensor 100 may be aligned such that the center of the hole 301, the center of the condenser lens 200 and the center of the infrared sensor 100 are located on a straight line.

The hole 301 may be smaller than the condenser lens 200. Alternatively, a diameter L2 of the hole 301 may be smaller than a diameter L3 of the condenser lens 200. In particular, the condenser lens 200 may be inserted into the opening at the rear end of the cover 300. In this instance, the hole 301 at the front end of the cover 300 may be smaller than the condenser lens 200 inserted into the rear end of the cover 300.

The cover 300 may be configured to shield at least some of infrared light entering the condenser lens 200. Additionally, as the diameter L2 of the hole 301 is smaller, the detection angle or the detection range may be smaller.

For example, the detection angle of the infrared sensor 100 may reduce from 120° down to 10° due to the cover 300. Additionally, the hole 301 may have various shapes including a polygonal shape such as triangular, square, rectangular shapes as well as semicircular, oval and elliptical shapes. The cover 300 may be coupled, fastened, fixed or assembled to the condenser lens 200.

According to the above-described configuration, the cover 300 may limit the detection range of the infrared sensor 100. Thus, the detection range of the infrared sensor 100 may reduce. However, even though the detection range of the infrared sensor 100 reduces, due to the condenser lens 200, sensing sensitivity in the detection range may be maintained or hardly reduced. The user may precisely set the detection area using the sensing device of the present disclosure.

According to the above-described configuration of the present disclosure, it may be possible to effectively reduce the detection angle without using the thick condenser lens 200 as the component. For example, it may be necessary to use the very thick condenser lens 200 to reduce the detection angle of the infrared sensor 100 down to about 10° without the cover 300. However, when the very thick condenser lens 200 is used, sensing sensitivity or sensing accuracy may be low.

Referring to FIGS. 1 to 5, the cover 300 of the sensing device according to an embodiment of the present disclosure may extend rearwards or in-X axis direction. The cover 300 may extend to the condenser lens 200 or the infrared sensor 100.

According to the above-described configuration of the present disclosure, the infrared sensor 100 may detect only infrared light passing through the hole 301. The cover 300 may shield infrared light entering the condenser lens 200 or the infrared sensor 100 through other path than a path passing through the hole 301. Accordingly, it may be possible to improve accuracy of the infrared sensor 100.

Referring to FIGS. 1 to 5, the cover 300 of the sensing device according to an embodiment of the present disclosure may include a portion having an increasing inner diameter L4 as it goes in the rearward direction or −X axis direction. Alternatively, a cross section of the cover 300 perpendicular to X axis direction may include a portion having an increasing diameter L4 as it goes in the rearward direction or −X axis direction. Additionally, at least a portion of the cover 300 may include a region having no increasing inner diameter as it goes in the rearward direction or −X axis direction. When the hole 301 is circular in shape, the cover 300 may have a conic shape. Additionally, when the hole 301 is polygonal in shape, the cover 300 may have a polygonal prism shape.

According to the above-described configuration of the present disclosure, infrared light passing through the hole 301 may stably enter the condenser lens 200. Accordingly, it may be possible to keep sensitivity of the infrared sensor 100 high.

Figure 6:
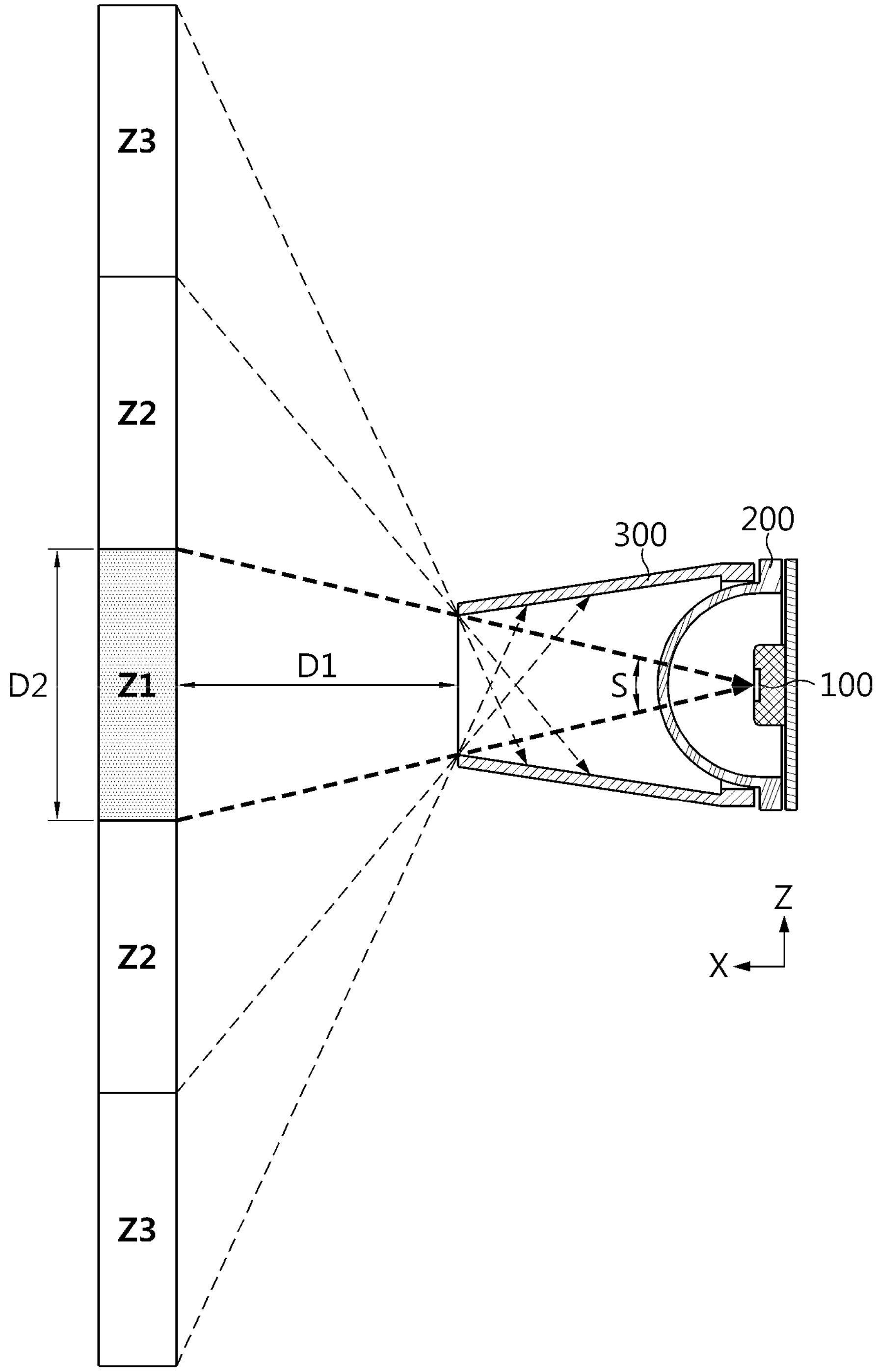
FIG. 6 is a diagram showing a detection area of a sensing device according to an embodiment of the present disclosure.

FIG. 6 is a diagram showing the detection area of the sensing device according to an embodiment of the present disclosure. Referring to FIGS. 5 and 6, a distance L1 between the hole 301 and the infrared sensor 100 of the sensing device according to an embodiment of the present disclosure may be larger than the diameter L2 of the hole 301. In this instance, the target detection range Z1 of the sensing device may be set to a distance D1 or less and a width D2 or less in the frontward direction or +X axis direction from the hole 301 of the cover 300. The distance L1 between the hole 301 and the infrared sensor 100 of the sensing device and the diameter L2 of the hole 301 may be changed to various numerical values depending on the target detection range of the sensing device.

For example, the diameter L2 of the hole 301 of the cover 300 may be 9 mm, the distance L1 between the hole 301 and the infrared sensor 100 may be 25 mm, the inner diameter L3 at the rear end of the cover 300 or the diameter L3 of the condenser lens 200 may be 26 mm. In this instance, the detection angle S of the infrared sensor 100 may be about 10.2°. The cover 300 may reduce the detection angle S of the infrared sensor 100 from about 120° down to about 10.2°. Additionally, the cover 300 may reduce the detection range of the infrared sensor 100 from Z1, Z2, Z3 down to Z1. In this instance, D1 may be about 10 m, and D2 may be about 1.8 m or less.

According to the above-described configuration of the present disclosure, since the cover 300 limits the detection range of the infrared sensor 100 to the target detection range, it may be possible to increase accuracy of the infrared sensor 100. Specifically, the sensing device does not detect a human entering Z2 and Z3 and only detects a human entering Z10, resulting in improved detection accuracy.

Referring to FIGS. 3 to 5, the condenser lens 200 according to an embodiment of the present disclosure may have a protruding shape in the frontward direction or +X axis direction. For example, the condenser lens 200 may be a Fresnel lens having a convex shape in the frontward direction or + axis direction.

The cover 300 may have an internal space 302. Additionally, the cover 300 may accommodate at least a portion of the condenser lens 200. Additionally, the condenser lens 200 may be fixed, fit-assembled or fastened to the inside of the cover 300.

According to the above-described configuration of the present disclosure, the cover 300 may be stably coupled to the condenser lens 200. Additionally, the cover 300 may be replaceably coupled to the condenser lens 200. Accordingly, the user may adjust the detection range of the sensing device by selectively coupling the cover 300 having various shapes to the condenser lens 200.

Additionally, According to the above-described configuration of the present disclosure, the infrared sensor 100 may only detect infrared light passing through the hole 301. The cover 300 may shield infrared light that does not pass through the hole 301 and enters the condenser lens 200 or the infrared sensor 100. Accordingly, it may be possible to improve accuracy of the infrared sensor 100.

Figure 7:
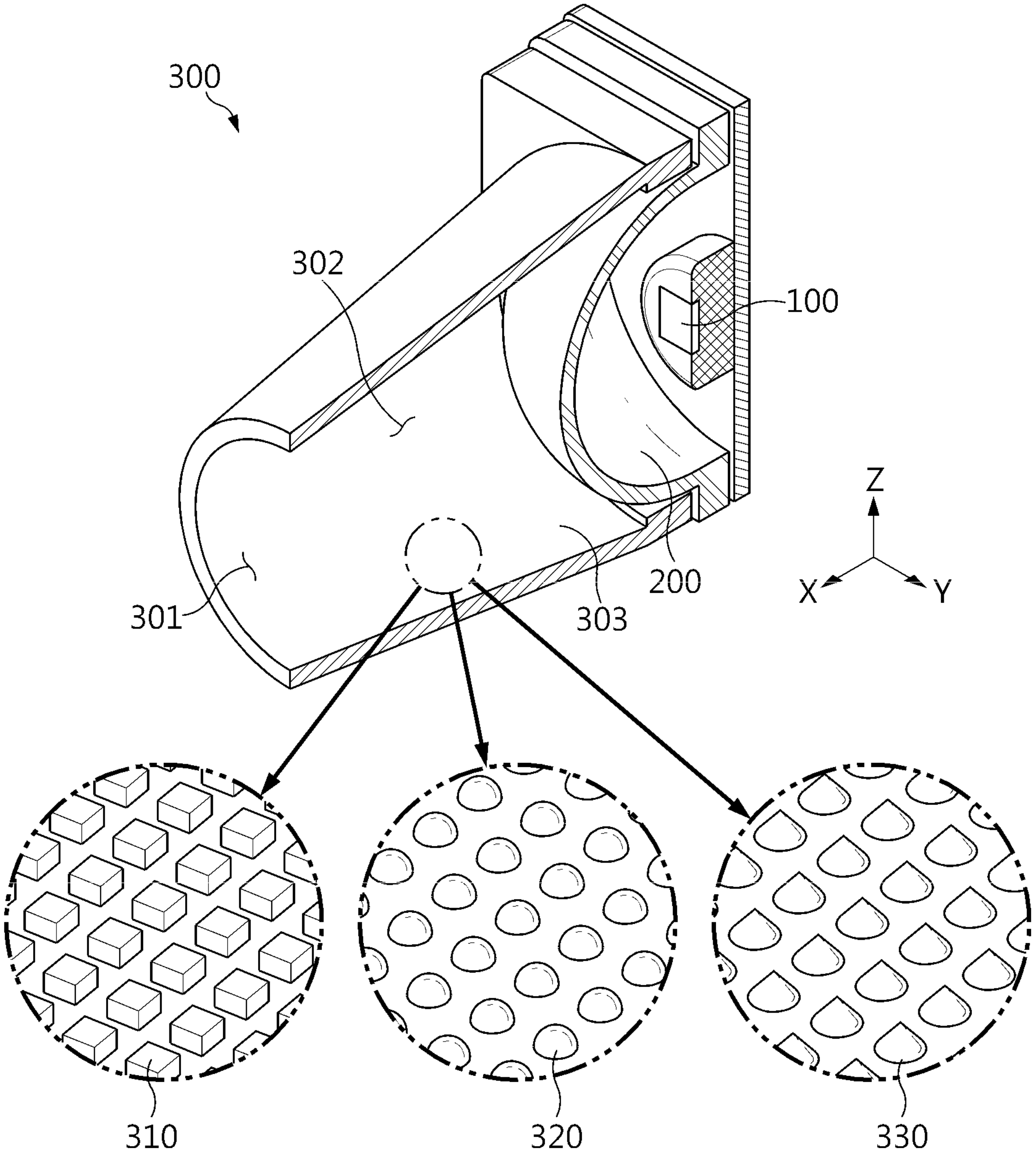
FIG. 7 is a diagram showing an inner surface of a cover according to an embodiment of the present disclosure.

FIG. 7 is a diagram showing the inner surface 303 of the cover 300 according to an embodiment of the present disclosure. Referring to FIG. 7, the inner surface 303 of the cover 300 of the sensing device according to an embodiment of the present disclosure may have an emissive structure. The cover 300 may be configured to absorb infrared light directly incident on the inner surface 303 of the cover 300 through the hole 301. Alternatively, the cover 300 may be configured not to reflect infrared light directly incident on the inner surface 303 of the cover 300 through the hole 301. In this instance, the inner surface 303 of the cover 300 may have the emissivity of about 0.9 or more.

For example, the inner surface 303 of the cover 300 may be coated with a high emissivity material. The high emissivity material may include leather or black or matte paint.

Additionally, a film of high emissivity material may be attached to the inner surface 303 of the cover 300.

Additionally, the inner surface 303 of the cover 300 may be processed to have high emissivity. For example, the emissivity of the inner surface 303 may be increased by sanding or chemical machining of the inner surface 303 of the cover 300.

Additionally, the emissivity may be increased by forming recesses 310, 320, 330 or protrusions 310, 320, 330 on the inner surface 303 of the cover 300. For example, the emissivity of the inner surface 303 may be increased by forming the recesses 310 in the shape of a rectangular hexahedron, the convex protrusions 320, or the protrusions 330 in the shape of a triangular cone with a sharp tip on the inner surface 303 of the cover 300.

According to the above-described configuration of the present disclosure, the cover 300 may only allow infrared light entering the condenser lens 200 as direct light through the hole 301 to pass through. The cover 300 may shield infrared light that is reflected from the inner surface 303 of the cover 300 and incident on the condenser lens 200. Accordingly, it may be possible to increase detection accuracy of the infrared sensor 100.

Figure 8:
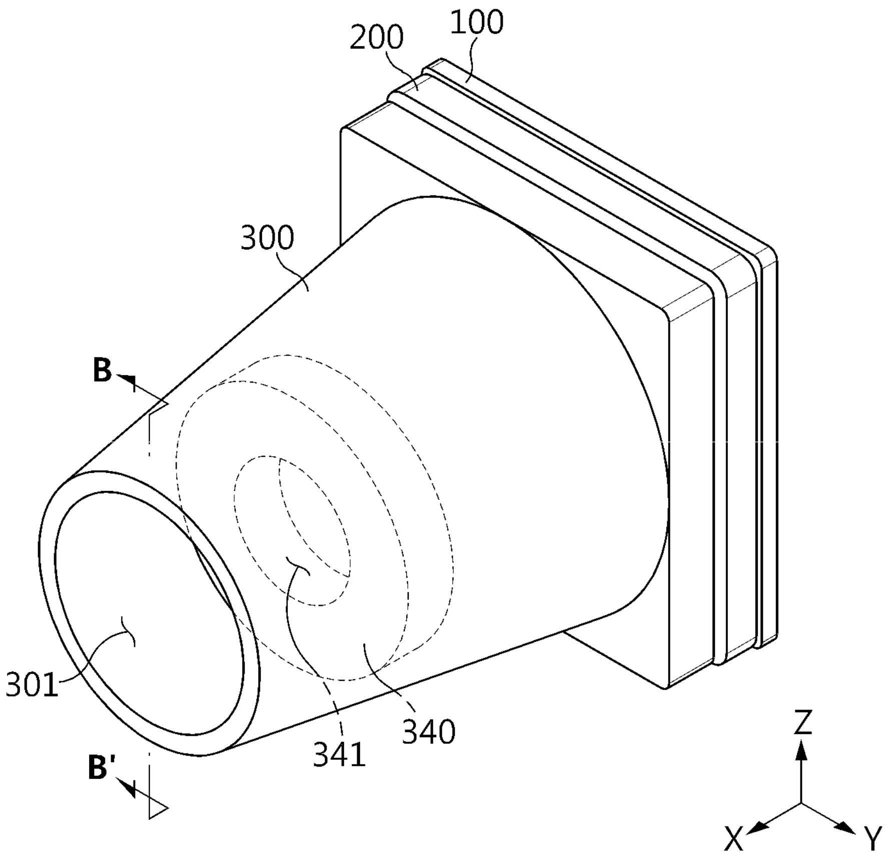
FIG. 8 is a partial perspective view of a sensing device according to an embodiment of the present disclosure.
Figure 9:
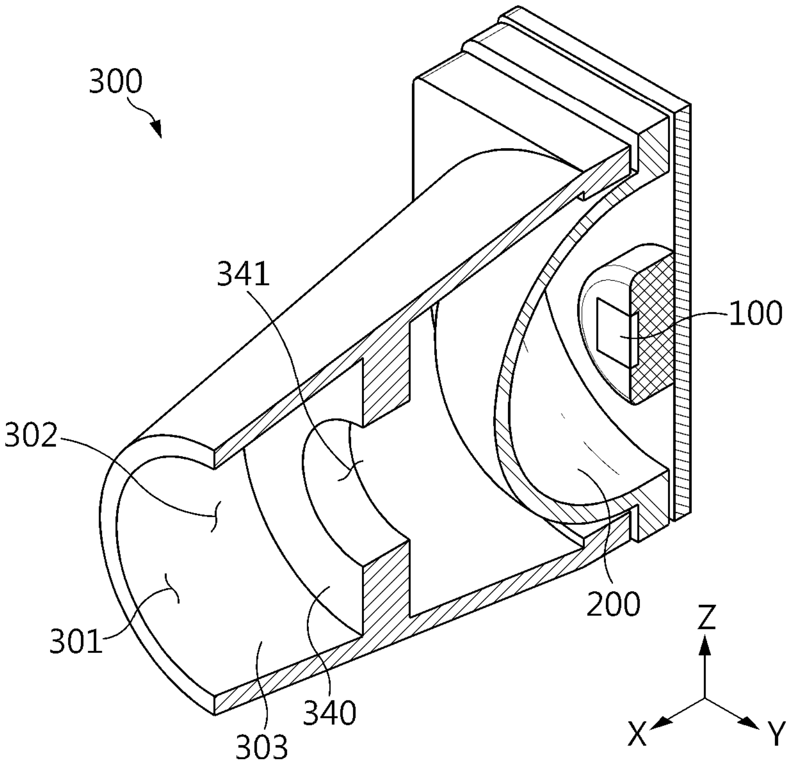
FIG. 9 is a cross-sectional perspective view of FIG. 8, taken along the line B-B'.
Figure 10:
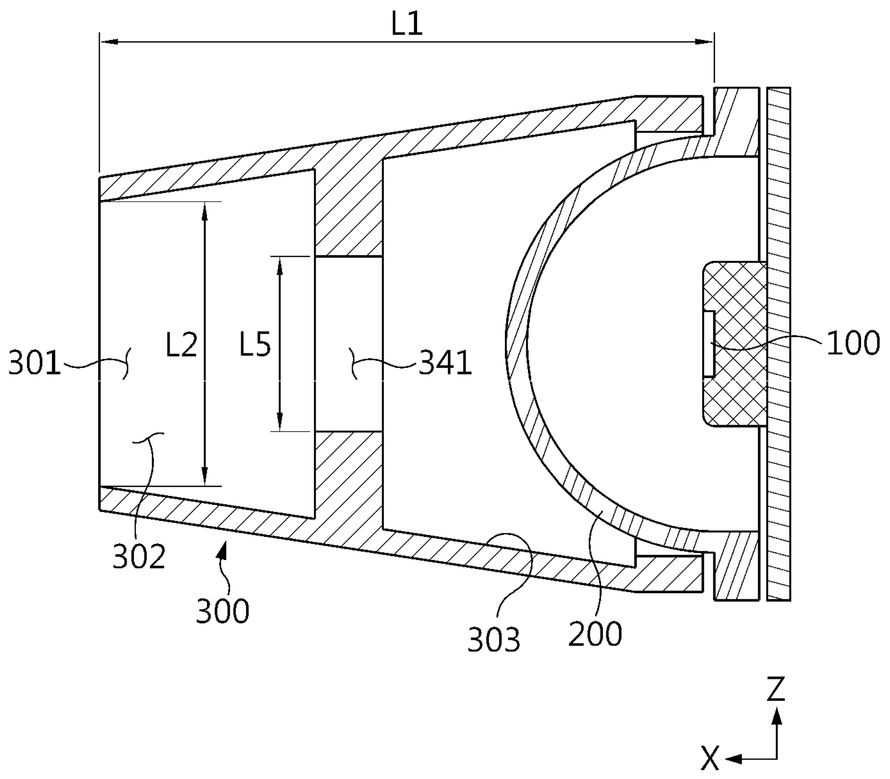
FIG. 10 is a cross-sectional view of FIG. 8, taken along the line B-B'.

FIG. 8 is a partial perspective view of the sensing device according to an embodiment of the present disclosure. FIG. 9 is a cross-sectional perspective view of FIG. 8, taken along the line B-B'. FIG. 10 is a cross-sectional view of FIG. 8, taken along the line B-B'. Referring to FIGS. 8 to 10, the cover 300 according to an embodiment of the present disclosure may include a shield wall 340 that protrudes from the inner surface 303 and covers the condenser lens 200.

The shield wall 340 may be integrally formed with the cover 300. Additionally, the shield wall 340 may be made of the same material as the cover 300. Additionally, the shield wall 340 may be formed in the shape of a ring. The shield wall 340 may extend along the circumference of the hole 301 or the circumference of the condenser lens 200.

The shield wall 340 may be located between the hole 301 and the condenser lens 200. The shield wall 340 may be configured to cover at least a portion of the condenser lens 200. Additionally, the shield wall 340 may shield at least some of incident infrared light through the hole 301.

According to the above-described configuration of the present disclosure, the shield wall 340 may further limit the detection range of the infrared sensor 100. Accordingly, it may be possible to further reduce the detection range of the infrared sensor 100. The user may set the detection area using the sensing device of the present disclosure more precisely.

Additionally, according to the above-described configuration of the present disclosure, the shield wall 340 may shield infrared light that is reflected from the inner surface 303 of the cover 300 and incident on the condenser lens 200. Accordingly, it may be possible to increase detection accuracy of the infrared sensor 100.

Referring to FIGS. 8 to 10, the shield wall 340 of the sensing device according to an embodiment of the present disclosure may include a shield hole 341 having a diameter L5 that is smaller than the diameter L2 of the hole 301. At least some of infrared light entering the cover 300 through the hole 301 may be shielded by the shield wall 340, and at least some may enter the condenser lens 200 through the shield hole 341. The hole 301 and the shield hole 341 may have different sizes but the same shape. For example, the hole 301 and the shield hole 341 may have a circular shape. Alternatively, the hole 301 and the shield hole 341 may have a polygonal shape.

According to the above-described configuration of the present disclosure, the shield wall 341 may further limit the detection range of the infrared sensor 100. Accordingly, it may be possible to reduce the length of the cover 300 in the front-rear direction or the distance L1 from the hole 301 to the infrared sensor 100, and reduce the size of the sensing device.

Figure 11:
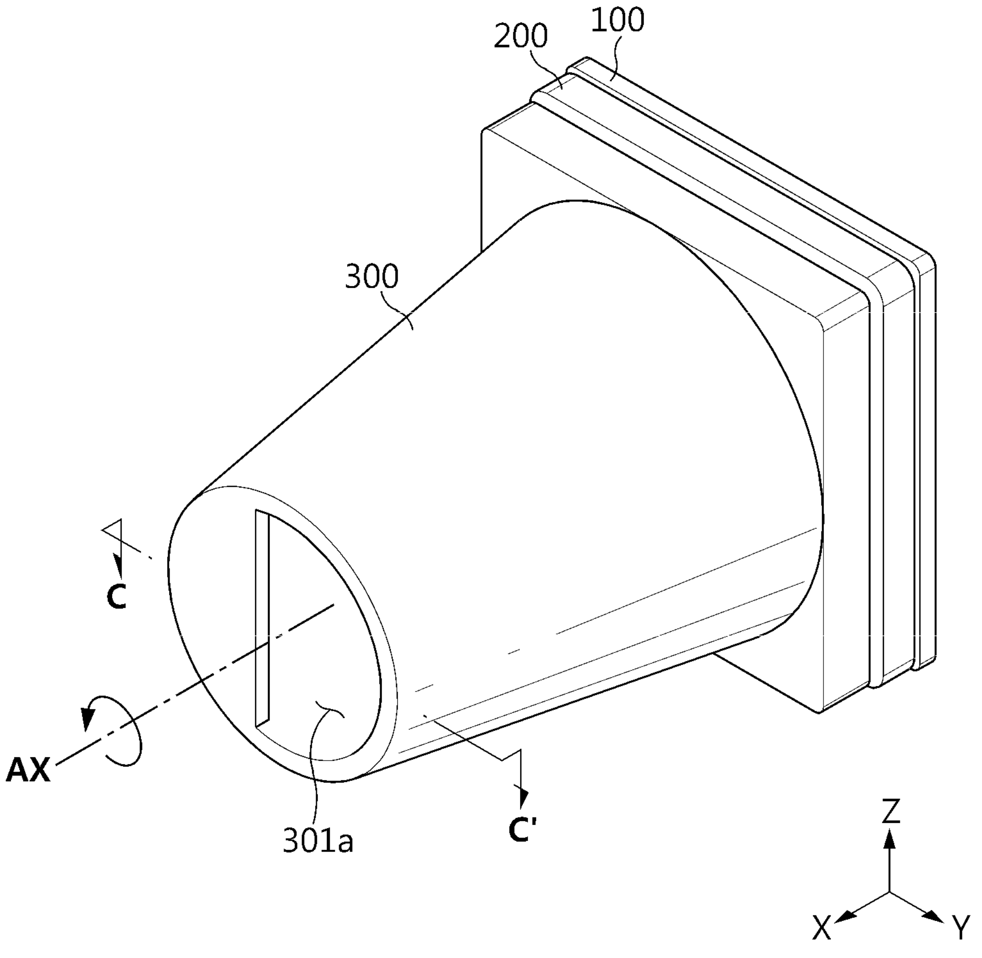
FIG. 11 is a partial diagram of a sensing device according to an embodiment of the present disclosure.
Figure 12:
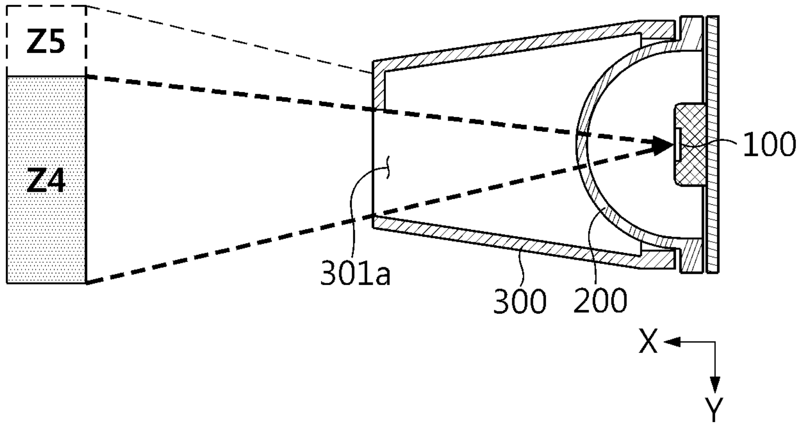
FIG. 12 is a diagram showing a detection range of a sensing device according to an embodiment of the present disclosure.

FIG. 11 is a partial diagram of the sensing device according to an embodiment of the present disclosure. FIG. 12 is a diagram showing the detection range of the sensing device according to an embodiment of the present disclosure. Referring to FIGS. 11 and 12, the cover 300 according to an embodiment of the present disclosure may be rotatable in the direction in which the infrared sensor 100 is oriented.

The direction in which the infrared sensor 100 is oriented may refer to a direction in which the sensing surface of the infrared sensor 100 is facing. Alternatively, the direction in which the infrared sensor 100 is oriented may refer to a direction perpendicular to the sensing surface of the infrared sensor 100. Alternatively, the direction AX in which the infrared sensor 100 is oriented may refer to the frontward direction or +X axis direction. The cover 300 may be rotatable in the direction AX in which the infrared sensor 100 is oriented or an optical axis (AX direction) of the condenser lens 200. That is, the direction AX in which the infrared sensor 100 is oriented or the AX direction of the condenser lens 200 may be a rotation axis AX of the cover 300.

In this instance, a hole 301*a* of the cover 300 may have an asymmetrical shape. For example, the hole 301*a* may be approximately in the shape of a semicircle, an arc or a portion of a circle. Due to the shape of the hole 301*a*, when the hole 301*a* is circular in shape, the detection range of the infrared sensor 100 may be limited to a partial area. For example, when the hole 301*a* is circular in shape, the detection range may be Z4 and Z5, but when the hole 301*a* is approximately semicircular in shape, the detection range may reduce to Z4.

In this instance, the user may adjust the detection range so that immobile objects such as walls, high voltage distribution boards, decorations, artworks and the like is included in the reduced detection range Z5.

Additionally, the detection range may be moved and adjusted by rotating the cover 300. The rotation of the cover 300 may be manipulated by the user's manual work or a driving means such as a motor.

According to the above-described configuration of the present disclosure, the detection range of the infrared sensor 100 may be finely adjusted by rotating the cover 300. Additionally, it may be possible to increase accuracy of the sensing device by excluding a detection needless range Z5 from the detection range.

Figure 13:
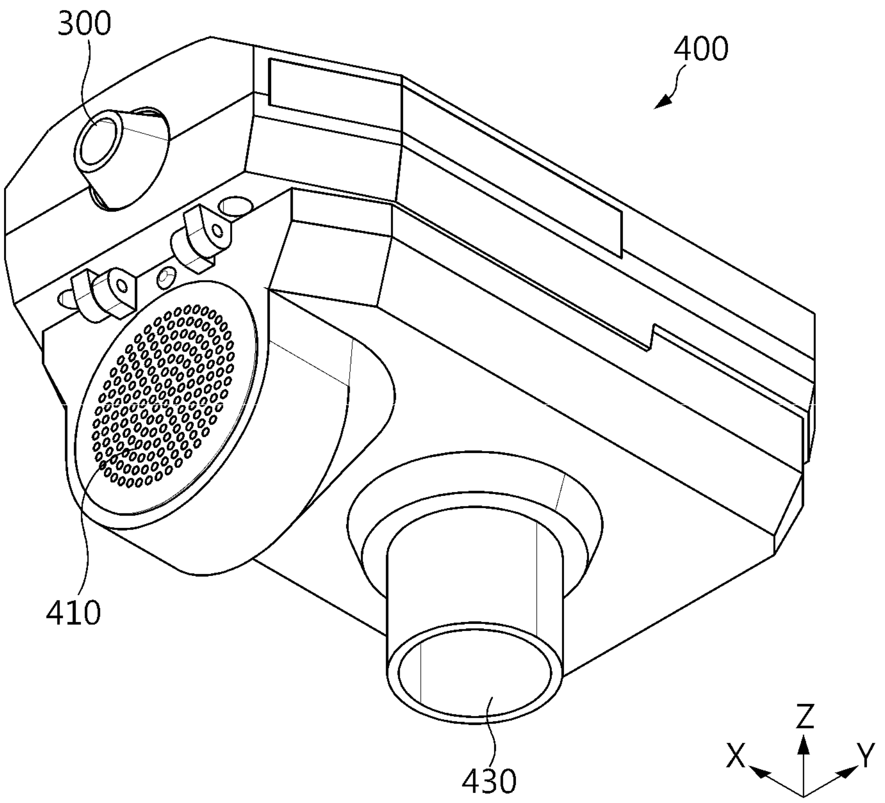
FIG. 13 is a diagram showing a sensing device according to an embodiment of the present disclosure.

FIG. 13 is a diagram showing the sensing device according to an embodiment of the present disclosure. Referring to FIG. 13, the sensing device according to an embodiment of the present disclosure may include the body 400. At least one of the infrared sensor 100, the condenser lens 200 or the cover 300 may be installed, fixed, coupled or fastened to the body 400. The body 400 may form an appearance of the sensing device and provide an internal space. The body 400 may include an electronic component inside to operate the sensing device. For example, the body 400 may include a control unit and a power device inside. The power device may be connected to an external power source, and may have a battery or a solar module to supply power by itself. Additionally, the body 400 may include a plurality of parts.

The body 400 may have a warning unit 410. The warning unit 410 may output sound or light when infrared light is detected through the infrared sensor 100. For example, the warning unit 410 may provide a warning by outputting sound notifying that unauthorized access is prohibited or flashing light for warning.

Additionally, the warning unit 410 may be configured to select an alarm mode. For example, the alarm mode may include a day mode and a nigh mode. In the day mode, when infrared light is detected, the warning unit 410 may output sound. Additionally, in the night mode, when infrared light is detected, the warning unit 410 may output flashing light without sound.

Figure 14:
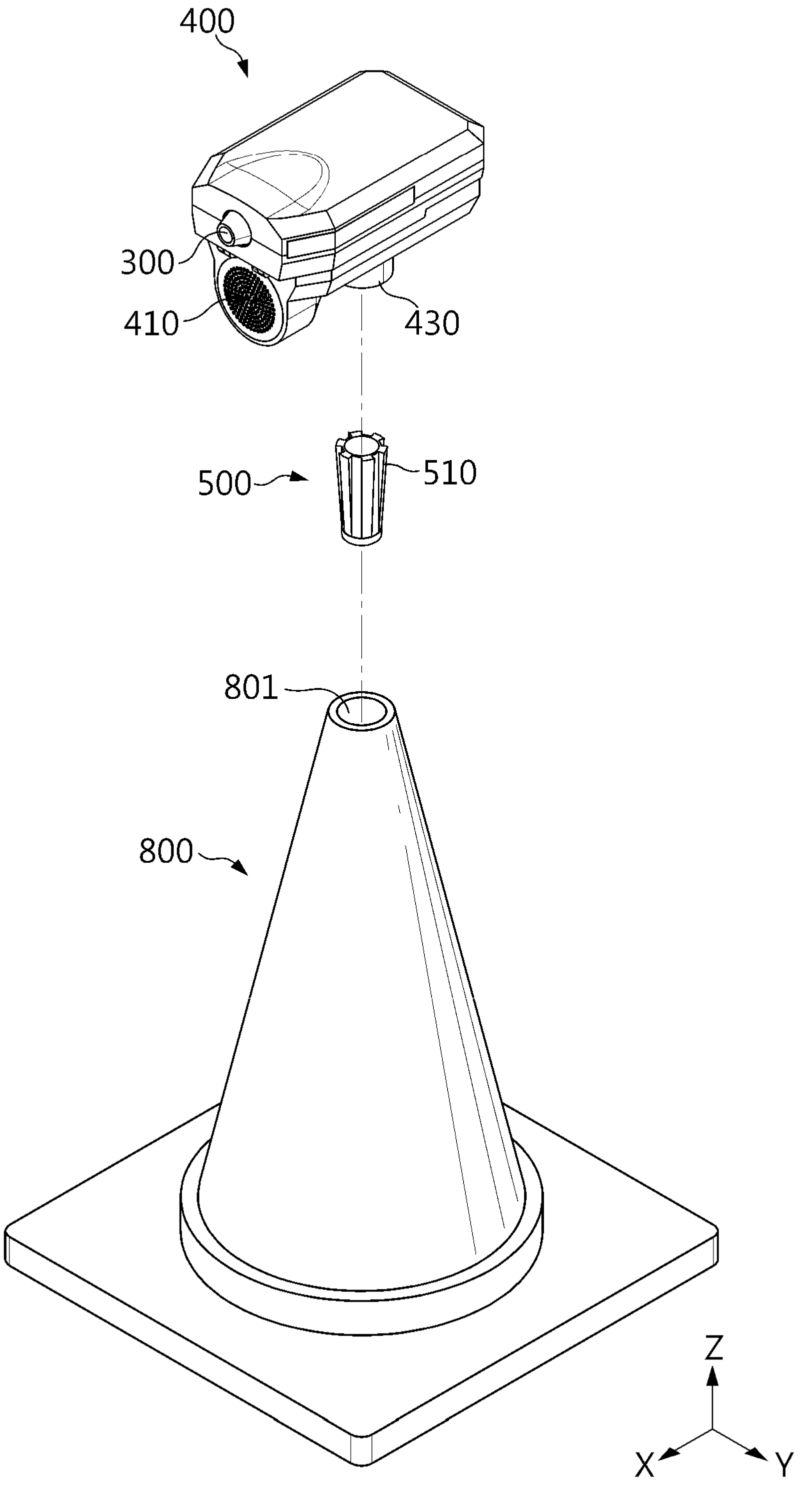
FIG. 14 is an exploded view of a configuration for installing a sensing device according to an embodiment of the present disclosure.
Figure 15:
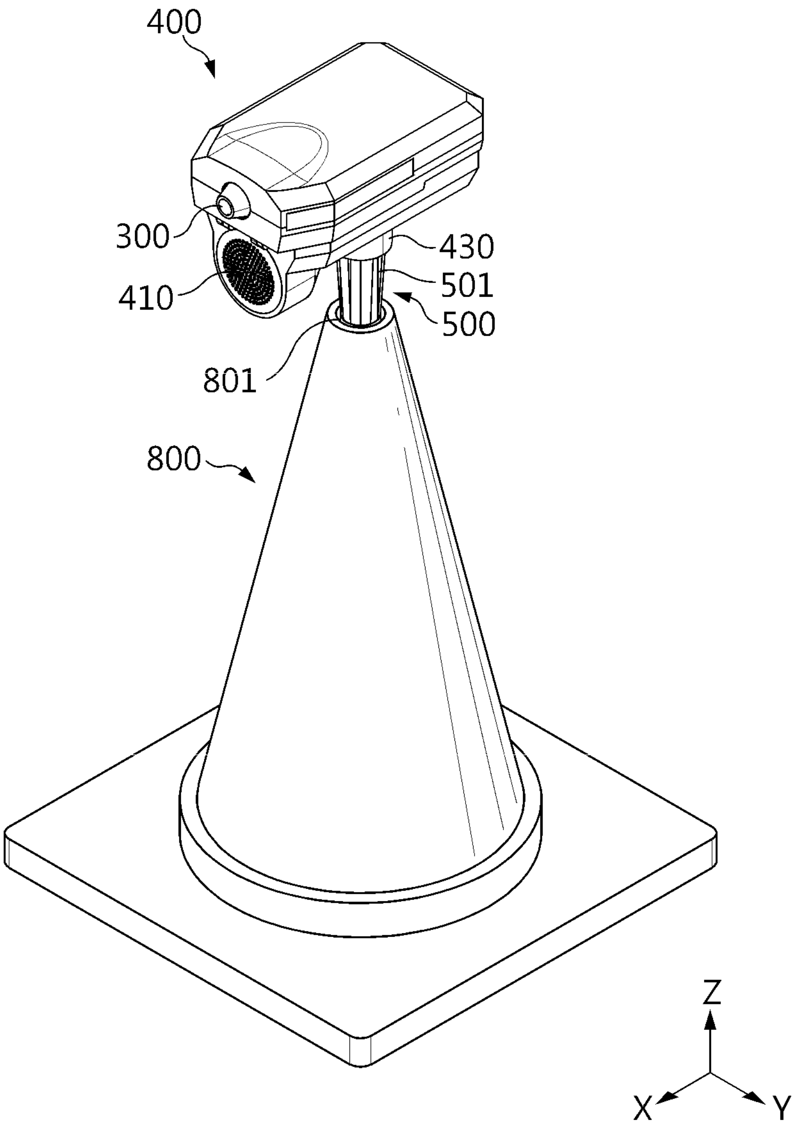
FIG. 15 is a diagram showing an installation example of a sensing device according to an embodiment of the present disclosure.
Figure 16:
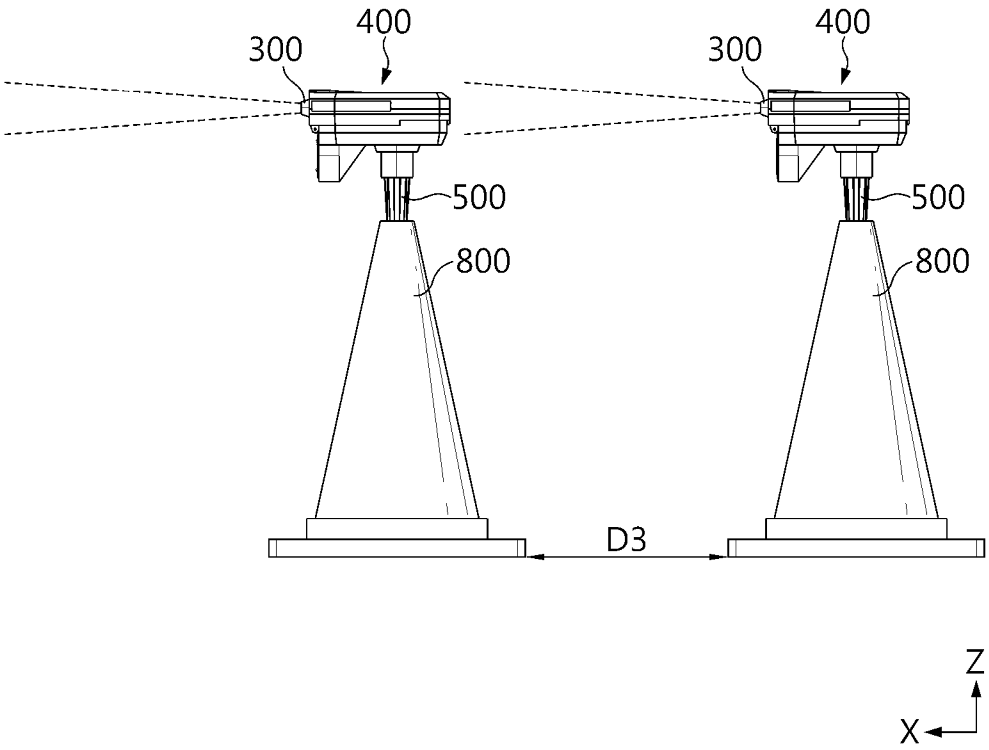
FIG. 16 is a diagram showing a plurality of sensing devices installed according to an embodiment of the present disclosure.

FIG. 14 is an exploded view of a configuration for installing the sensing device according to an embodiment of the present disclosure. FIG. 15 is a diagram showing an installation example of the sensing device according to an embodiment of the present disclosure. FIG. 16 is a diagram showing a plurality of sensing devices installed according to an embodiment of the present disclosure. Referring to FIGS. 13 to 16, the sensing device according to an embodiment of the present disclosure may further include a coupling bar 430 extending below the body 400. The coupling bar 430 may be formed on the lower surface of the body 400, and extend in-Z axis direction or downward direction.

The coupling bar 430 may be coupled, inserted, fixed, fastened or assembled to the upper end or upper part of a coupling pipe 500. The coupling pipe 500 may extend in the downward direction or −Z axis direction. The lower end or lower part of the coupling pipe 500 may be coupled, inserted, fixed, fastened, installed or assembled to a hole 801 of a traffic cone 800. The coupling pipe 500 may include a rib 510 extending along the lengthwise direction of the coupling pipe 500. The rib 510 may include a plurality of ribs 510, and be arranged along the circumference of the coupling pipe 500. The rib 510 may protrude in the circumferential direction of the coupling pipe 500 as it goes in +Z axis direction. Thereby, the outer diameter of the coupling pipe 500 may increase along +Z axis direction.

The traffic cone 800 may be a structure installed at construction sites, dangerous goods storages, roads and the like to indicate that the entry or passing of the corresponding areas are prohibited/restricted for a safety reason. The traffic cone 800 may be made of rubber or plastics, be hollow inside and have the hole 801 on top.

Additionally, a plurality of sensing devices may be installed at a regular interval. For example, the sensing device may be installed in each of a plurality of traffic cones 800. The plurality of sensing devices makes it possible to set the wide detection range. In this instance, the plurality of sensing devices or the plurality of traffic cones 800 may be arranged at the interval D3. For example, D3 may be set to about 1 to 7 m.

According to the above-described configuration of the present disclosure, the sensing device may be stably coupled, inserted, fixed, fastened, installed or assembled to the traffic cone 800. Accordingly, it may be possible to install the sensing device by a relatively simple configuration.

Figure 17:
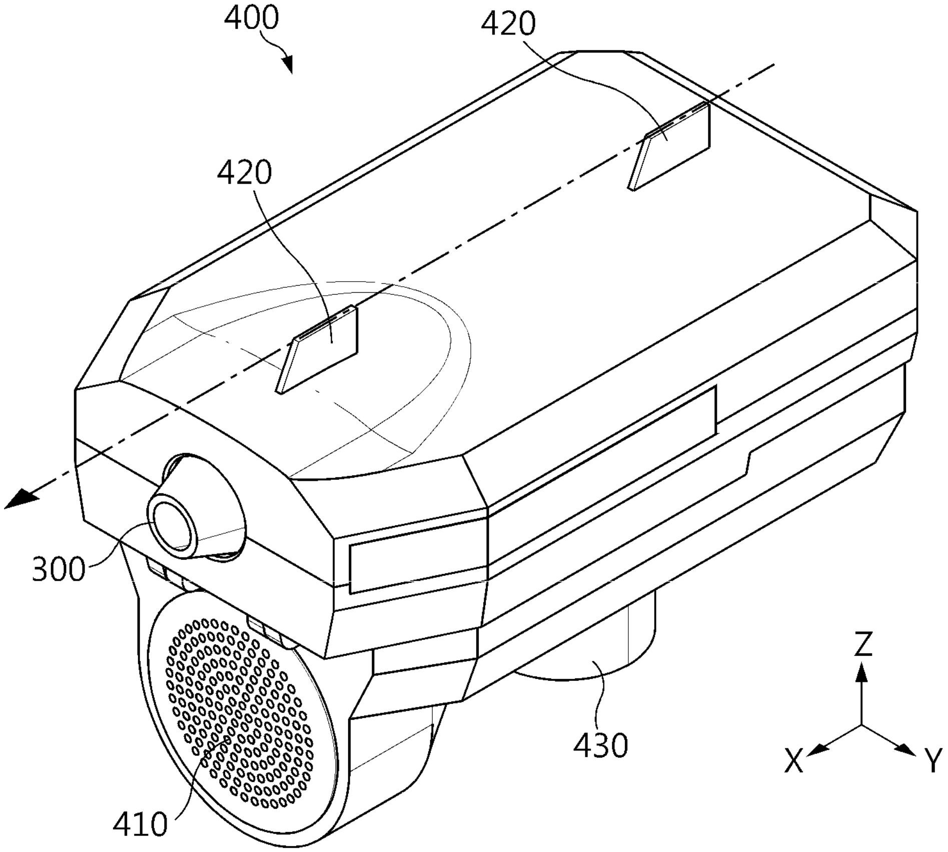
FIG. 17 is a diagram showing a sensing device according to an embodiment of the present disclosure.

FIG. 17 is a diagram showing the sensing device according to an embodiment of the present disclosure. Referring to FIG. 17, the sensing device according to an embodiment of the present disclosure may further include a pair of sights 420 protruding from the upper surface of the body 400.

The pair of sights 420 may be disposed along the X axis direction. An imaginary line connecting the pair of sights 420 may be parallel to the direction AX in which the infrared sensor 100 is oriented. The sights 420 may be configured to visually guide the detection direction AX of the infrared sensor 100 to the user.

According to the above-described configuration of the present disclosure, the user may easily install the sensing device using the sights 420. When the sensing device is installed in a construction site or temporarily installed, the user may install the sensing device in a simple and accurate manner using the sights 420. For example, when the sensing device is installed at the traffic cone 800, the user may set the detection range by rotating the sensing device using the sights 420.

Figure 18:
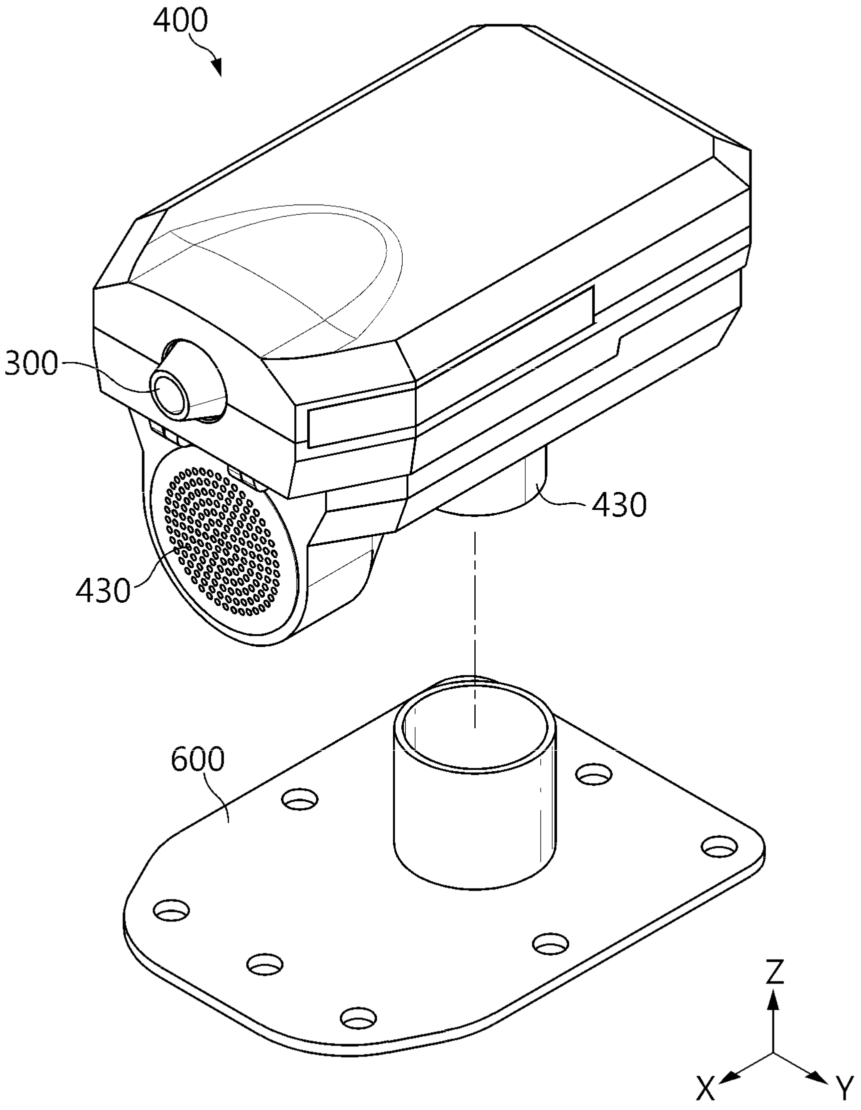
FIG. 18 is an exploded view of a configuration for installing a sensing device according to an embodiment of the present disclosure.
Figure 19:
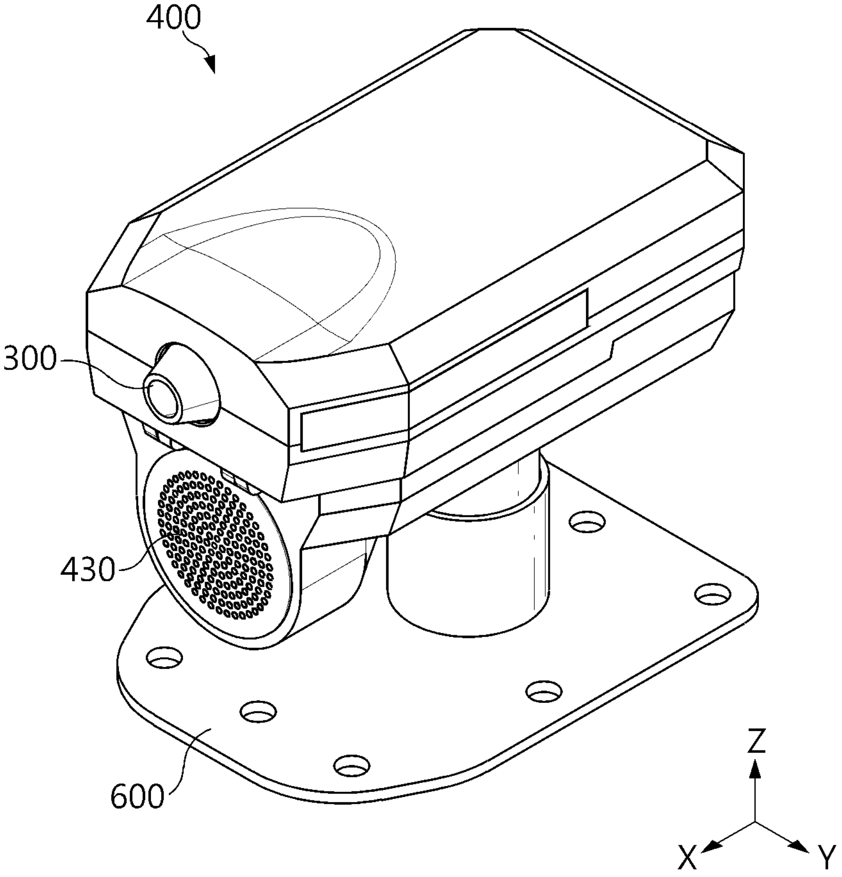
FIG. 19 is a diagram showing an installation example of a sensing device according to an embodiment of the present disclosure.
Figure 20:
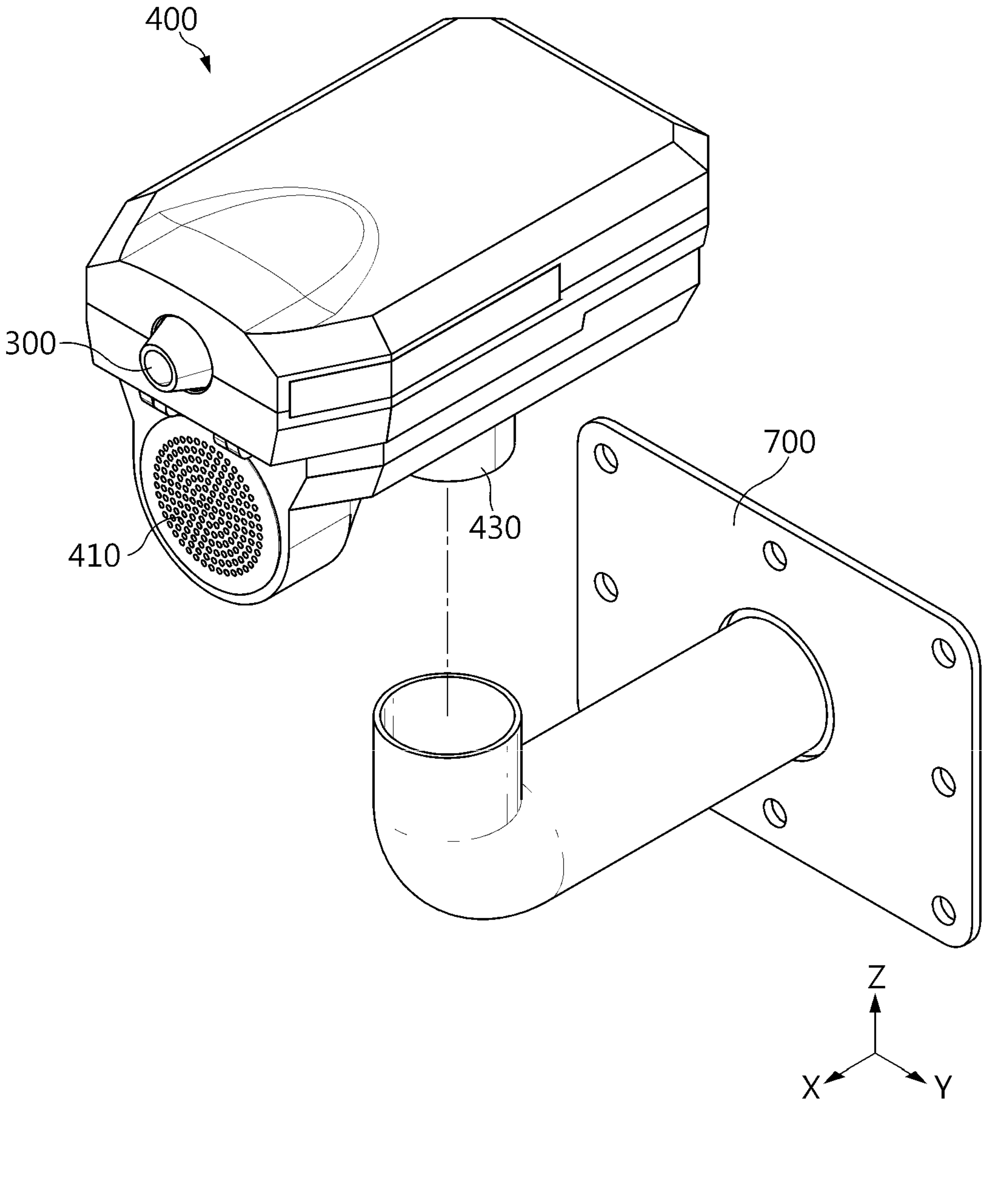
FIG. 20 is an exploded view of a configuration for installing a sensing device according to an embodiment of the present disclosure.
Figure 21:
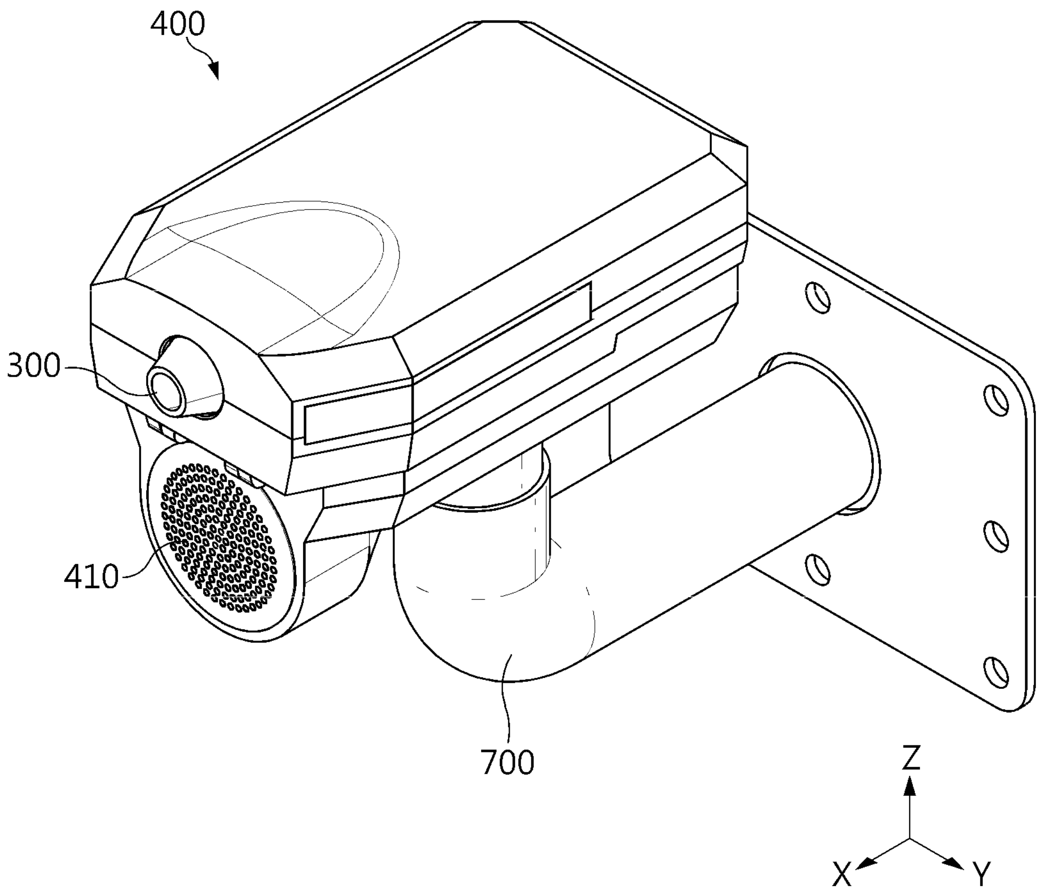
FIG. 21 is a diagram showing an installation example of a sensing device according to an embodiment of the present disclosure.

FIG. 18 is an exploded view of a configuration for installing the sensing device according to an embodiment of the present disclosure. FIG. 19 is a diagram showing an installation example of the sensing device according to an embodiment of the present disclosure. FIG. 20 is an exploded view of a configuration for installing the sensing device according to an embodiment of the present disclosure. FIG. 21 is a diagram showing an installation example of the sensing device according to an embodiment of the present disclosure. Referring to FIGS. 18 to 21, the sensing device according to an embodiment of the present disclosure may further include a mount 600, 700 that is coupled to the coupling bar 430.

One side of the mount 600, 700 may be coupled, inserted, fixed, fastened or assembled to the coupling bar 430. Additionally, the other side of the mount 600, 700 may be coupled, inserted, fixed, fastened or assembled to a fixture such as a wall, a guardrail and an instrument. The mount 600, 700 may be referred to as a bracket 600, 700, a wall mount 600, 700 or a clamp 600, 700. The first mount 600 may be installed on the X-Y plane. Additionally, the second mount 700 may be installed on the Y-Z plane.

According to the above-described configuration of the present disclosure, the user may stably install the sensing device using the mount 600, 700.

Additionally, the sensing device according to an embodiment of the present disclosure may include a Velcro®. For example, the Velcro® may be disposed on one surface of the body 400. Additionally, the Velcro® may be disposed on a structure or fixture at which the sensing device will be installed. The sensing device may be fixed or installed through the Velcro®.

Additionally, the sensing device according to an embodiment of the present disclosure may include a magnet. For example, the magnet may be disposed on one surface of the body 400. Additionally, the magnet may be disposed on a structure or fixture at which the sensing device will be installed. The sensing device may be fixed or installed through the magnet.

The terms indicating directions such as upper, lower, left, right, front and rear are used for convenience of description, but it is obvious to those skilled in the art that the terms may change depending on the position of the stated element or an observer.

While the present disclosure has been hereinabove described with regard to a limited number of embodiments and drawings, the present disclosure is not limited thereto and it is apparent that a variety of changes and modifications may be made by those skilled in the art within the technical aspect of the present disclosure and the scope of the appended claims and their equivalents.

What is claimed is:

1. A sensing device, comprising:

an infrared sensor;

a condenser lens located adjacent to a front side of the infrared sensor; and a cover located adjacent to a front side of the condenser lens and covering the condenser lens, the cover having a hole that is smaller than the condenser lens, wherein the cover extends rearwards and includes a shield wall protruding from an inner surface and covering the condenser lens, wherein the shield wall is integrally formed with the cover, and wherein the shield wall is located between the hole and the condenser lens.

2. The sensing device according to claim 1, wherein the cover includes a portion having an inner diameter that increases from a front side thereof remote from the condenser lens toward a rear side thereof adjacent to the condenser lens.

3. The sensing device according to claim 1, wherein a distance between the hole of the cover and the infrared sensor is larger than a diameter of the hole.

4. The sensing device according to claim 1, wherein an inner surface of the cover has an emissive structure recessed into or protruding from the inner surface.

5. The sensing device according to claim 1, wherein the condenser lens has a shape protruding frontward away from the infrared sensor, and the cover accommodates at least a portion of the condenser lens within an inner space thereof.

6. The sensing device according to claim 1, wherein the shield wall defines a shield hole therein having a smaller diameter than the hole of the cover.

7. The sensing device according to claim 1, wherein the cover is rotatable relative to the infrared sensor.

8. The sensing device according to claim 1, further comprising:

a body into which the infrared sensor is installed; and a warning unit disposed in the body and configured to output sound or light in response to infrared light detected by the infrared sensor.

9. The sensing device according to claim 1, further comprising:

a body into which the infrared sensor is installed; and a pair of sights protruding outwardly from an upper surface of the body.

10. The sensing device according to claim 1, further comprising:

a body into which the infrared sensor is installed; and a coupling bar extending outwardly from a lower surface of the body.

11. The sensing device according to claim 10, further comprising a mount that is coupled to the coupling bar.

* * * * *